(12) United States Patent
Kulkarni et al.

(10) Patent No.: US 9,569,485 B2
(45) Date of Patent: Feb. 14, 2017

(54) OPTIMIZING DATABASE QUERY

(75) Inventors: Vaibhav Murlidhar Kulkarni, Karnataka (IN); Sweta Singh, Karnataka (IN)

(73) Assignee: International Business Machines Corporation, Armonk, NY (US)

(*) Notice: Subject to any disclaimer, the term of this patent is extended or adjusted under 35 U.S.C. 154(b) by 1239 days.

(21) Appl. No.: 12/950,156

(22) Filed: Nov. 19, 2010

(65) Prior Publication Data

US 2012/0130982 A1 May 24, 2012

(51) Int. Cl.
*G06F 7/00* (2006.01)
*G06F 17/30* (2006.01)

(52) U.S. Cl.
CPC ... *G06F 17/30421* (2013.01); *G06F 17/30471* (2013.01)

(58) Field of Classification Search
CPC .............. G06F 17/30421; G06F 17/30471
USPC ....................................................... 707/713
See application file for complete search history.

(56) References Cited

U.S. PATENT DOCUMENTS

| 7,152,073 B2 | 12/2006 | Gudbjartsson | |
| 2002/0064296 A1* | 5/2002 | Kondo et al. | 382/100 |
| 2002/0143754 A1 | 10/2002 | Paulley | |
| 2003/0100960 A1* | 5/2003 | Edwards et al. | 700/28 |
| 2004/0220904 A1* | 11/2004 | Finlay et al. | 707/3 |
| 2007/0027845 A1* | 2/2007 | Dettinger et al. | 707/3 |
| 2007/0112736 A1* | 5/2007 | Okamoto et al. | 707/3 |
| 2008/0040317 A1 | 2/2008 | Dettinger | |
| 2009/0132609 A1* | 5/2009 | Barsness et al. | 707/203 |
| 2009/0171890 A1* | 7/2009 | Johnson et al. | 707/2 |
| 2010/0005077 A1* | 1/2010 | Krishnamurthy et al. | 707/4 |
| 2010/0275192 A1 | 10/2010 | Serebryany | |

FOREIGN PATENT DOCUMENTS

| CN | 101436192 A | 5/2009 |
| JP | H0462667 A | 2/1992 |
| JP | 2004220283 A | 8/2004 |
| JP | 2005353024 A | 12/2005 |
| JP | 2008234495 A | 10/2008 |
| JP | 2010129022 A | 6/2010 |

OTHER PUBLICATIONS

"Study of preference driven database query systems," Ilioiu Florin, Master Informatique (Université de Rennes I)—Feb. 2006, Coordinator: Daniel Rocacher (Enssat—Lannion), Ludovic Liétard (IUT—Lannion).

(Continued)

*Primary Examiner* — Boris Gorney
*Assistant Examiner* — Christy Y Kim
(74) *Attorney, Agent, or Firm* — Anthony V. S. England; Mohammed Y. Kashef (57) ABSTRACT

Embodiments of the present invention relate to a method, computer program product and system for optimizing database transactions configured for receiving a query. The query specifies a set of predicates supplied to the query and a minimal number of predicates to be satisfied for the query to be true. An operation using the query is performed on a repository that is stored in a computer readable storage medium. A set of results satisfying the minimal number of predicated is rendered.

17 Claims, 3 Drawing Sheets

(56) References Cited

OTHER PUBLICATIONS

Chinese Office Action dated Nov. 5, 2013 (identified as IIE113681 in upper right corner) for IN920100167CN1.
Sep. 18, 201212909029NFR.
Mar. 12, 201312909029NOA.

* cited by examiner

OPTIMIZING DATABASE QUERY

RELATED APPLICATION

The present invention is related to similar subject matter of co-pending and commonly assigned U.S. patent application Ser. No. 12/909,029 entitled "QUERY OPTIMIZATION," filed on Oct. 21, 2010, which is hereby incorporated by reference.

TECHNICAL FIELD

The present invention relates to query optimization, and more particularly to retrieving a subset of data from a data repository using the query optimization.

BACKGROUND

Data repositories and in particular, databases are computerized information storage and retrieval systems. A database query refers to a set of commands or clauses for retrieving data stored in the databases. Queries may come from users, application programs, or remote systems. A query may specify a specific location, such as, a table or a column in a database to retrieve data from, how to join columns from multiple tables, and conditions that must be satisfied for a particular data record to be included in a query result set. Current structured data, typically relational databases, process queries composed in an exacting format specified by a query language. For example, the widely used Structured Query Language (SQL) is supported by many relational databases.

There are many disciplines that rely on databases, such as life sciences, require increasingly complex databases and database queries. Running large or complex query typically uses multiple resources and has been a subject of study and interest.

SUMMARY

Embodiments of the invention are directed to a method, a system, and a computer program product for optimizing database transactions. Accordingly, embodiments of the invention receive a query. The query specifies a set of predicates of which a minimum number of predicates have to be satisfied for the query to be true. An operation is performed using the query on a repository stored in a computer readable storage medium. A set of results satisfying the minimal number of predicates is rendered.

An embodiment directed to a computer program product comprising a computer readable storage medium includes computer usable code for optimizing database transactions. The embodiment includes computer usable code for receiving a query. The query specifies a set of predicates supplied to the query and a minimal number of predicates in the set to be satisfied for the query to be true. The embodiment further includes computer usable code for performing an operation using the query on a repository stored in a computer readable storage medium. The embodiment further includes computer usable code for rendering a set of results satisfying the minimal number of predicates.

An embodiment directed to a data processing system for optimizing database transactions includes a storage device including a storage medium, wherein the storage device stores computer usable program code, a processor, wherein the processor executes the computer usable program code. The computer usable program code of the embodiment includes computer usable code for receiving a query, wherein the query specifies a set of predicates supplied to the query and a minimal number of predicates in the set to be satisfied for the query to be true, computer usable code for performing an operation using the query on a repository stored in a computer readable storage medium, and computer usable code for rendering a set of results satisfying the minimal number of predicates.

BRIEF DESCRIPTION OF THE SEVERAL VIEWS OF THE DRAWINGS

Embodiments of the invention are described below, by way of example only, with reference to the following schematic drawings, where.

DETAILED DESCRIPTION

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 1:
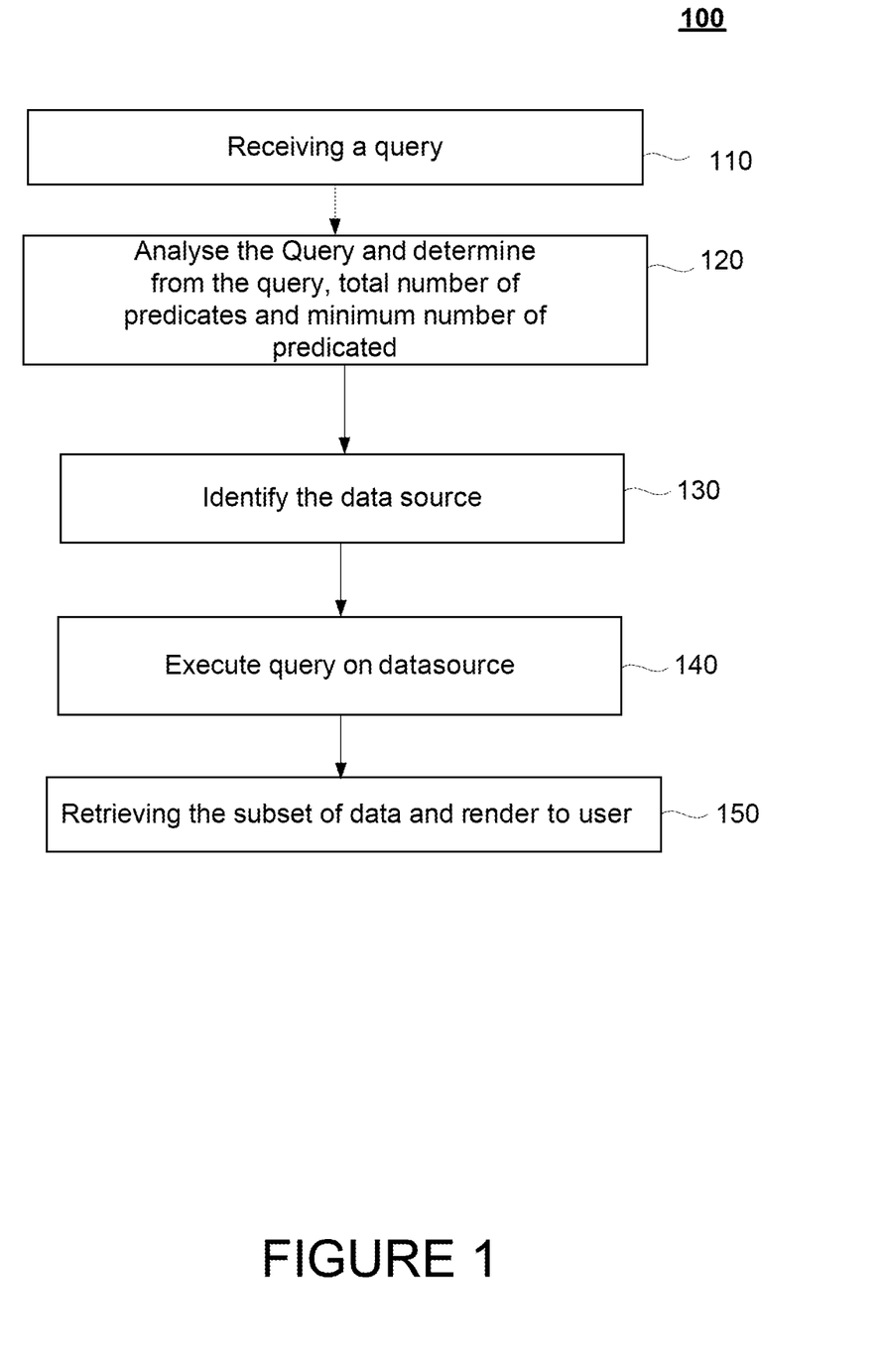
FIG. 1 depicts an example embodiment of flow chart for a method of retrieving a subset of data from a data repository.

Embodiments of the invention are directed to a method, a system, and a computer program product for optimizing a database query for retrieving a subset of data from a data repository. FIG. 1 shows an example embodiment of a flow chart 100 for retrieving a subset of data from a data repository. Step 110 denotes receiving a query. Once the query is received, next, in step 120 the query is analyzed to determine from the query the total number of predicates in the query and the minimal number of predicates required to perform the operation. Once this is determined, in step 130, the data source upon which this query operates is identified. In Step 140, the query is executed on the data source. In step 150, based on the query that operated on the data source, a data subset satisfying the query is retrieved and rendered to the user.

Receiving the query includes receiving a set of predicates and a pre-defined threshold that indicates a minimum number of predicates from the set of predicates needed to be true. In one embodiment, advantageously, each predicate of the set of predicates is preferably represented as a bitwise predicate pattern to generate a set of bitwise predicate patterns. If required, a second query is generated using the set of bitwise predicate patterns and a plurality of logical operators in the manner of an embodiment described in the related application incorporated by reference herein. The plurality of logical operators comprises Boolean operators.

The step of generating a second query according to an embodiment uses the pre-defined threshold of predicates. The subset of data is retrieved from the data repository using the query. Generating the second query further includes identifying a set of valid bitwise patterns from the set of bitwise predicate patterns using the first query and parsing the set of valid bitwise patterns using the plurality of logical operators to generate a logical bitwise expression, and then factorizing the logical bitwise expression. Parsing and factorizing preferably use Boolean properties. Then a mapping is created of the factorized logical bitwise expression to corresponding predicates from the set of predicates, to generate a logical predicate expression. The second query is generated by modifying the first query using the logical predicate expression. In one embodiment, the data repository is a structured data, such as in a relational or object-oriented database, and the first query and the second query are both Structured Query Language (SQL) queries.

Preferably the query in accordance with an embodiment includes an 'AT-LEAST' clause, and a pre-defined threshold of predicates that indicates a minimum number of predicates from the set of predicates those need to be true. In an example mode, an illustration of retrieving a subset of data from a data repository is given below. Database query optimizers try to reduce the number of predicates to optimize the query performance. However sometimes SQL queries have large number of predicates joined by OR conditions, which makes reducing the number of predicates difficult.

An example embodiment where business decisions are based on meeting a minimal set of pre-requisites is described below:

For yearly bonus distribution, the criterion is set such that an employee that satisfies at least 3 out of the 5 conditions, i.e. predicates, is eligible for a bonus. The example predicates are as follows:
  1. Performance rating of 1 or 2+. (Rating)
  2. Recommended by Manager (Manager_Recom)
  3. Business unit profit>3% (BU_profit)
  4. Salary is less than average salary at his level
  5. Employed in the organization for more than 2 years (Current_dt-Join_dt)

Assuming that the employee data is stored in the database, a query needs to be written to get employee records who meet the pre-requisites. This is the subset of data stored in the database. Typically a query to select rows from a table which matches at least 3 out of 5 conditions is written using a typical combination of 'AND' and 'OR' clauses in SQL. Assuming that all the data is available in the employee table, a typical query may be as follows:
  select * from employee where
  ((Rating in (1,2+)) and (Manager_Recom='Y') and (BU_profit>3)) OR
  ((Rating in (1,2+)) and (Manager_Recom='Y') and (Salary<(select Avg(Salary) from employee))) OR
  ((Rating in (1,2+)) and (Manager_Recom='Y') and (Current_dt-Join_Dt>2 years)) OR
  ((Rating in (1,2+)) and (BU_profit>3) and (Salary<(select Avg(Salary) from employee))) OR
  ((Rating in (1,2+)) and (BU_profit>3) and (Current_dt-Join_Dt>2 years)) OR
  ((Rating in (1,2+)) and (Salary<(select Avg(Salary) from employee)) and (Current_dt-Join_Dt>2 years)) OR
  ((Manager_Recom='Y') and (BU_profit>3) and (Salary<(select Avg(Salary) from employee))) OR
  ((Manager_Recom='Y') and (BU_profit>3) and (Current_dt-Join_Dt>2 years)) OR
  ((Manager_Recom='Y') and (Salary<(select Avg(Salary) from employee)) and (Current_dt-Join_Dt>2 years)) OR
  ((BU_profit>3) and (Salary<(select Avg(Salary) from employee)) and (Current_dt-Join_Dt>2 years))

As can be noticed from the above query, the query consists of a number of OR clauses and many predicates, and in conventional SQL there is no easy way of writing such queries and reducing the number of predicates in such queries. Such a query is time consuming to write, to process, and uses a significant amount of computing resources to execute.

Embodiments of the invention use bit representation for predicates internally in the optimizer and help reduce the number of predicates in the SQL. Condensing the predicates helps reduce the processing cycles to execute the query, thus improving query performance. Example embodiments use well studied Boolean properties:

$(a|b)|c = a|(b|c)$  Associative property:

$(a \& b) \& c = a \& (b \& c)$ $a|(b \& c) = (a|b) \& (a|c)$  Distributive property:

$a \& (b|c) = (a \& b)|(a \& c)$

It should be noted that Logical 'AND' is expressed as '&' or '*' and Logical 'OR' is expressed as '|' or '+'. Absence of any operator between 2 expressions is assumed to be 'AND', for example, 01(0+1) is equivalent to 0&1&(0|1) i.e. 0*1*(0+1)

The following should be appreciated regarding the above example and regarding how the bitwise predicate patterns are formed, in an embodiment: Each logical predicate is represented by a set of bits. Such a set of bits is referred to herein as a "bitwise predicate pattern." Each set may have the same number of bits. Each bitwise predicate pattern has only one bit ON. Each bitwise predicate pattern uniquely represents a single corresponding one of the logical predicates. For each bitwise predicate pattern, the one bit that is ON indicates which one of the logical predicates the particular bitwise predicate pattern represents.

As an example of using well studied Boolean algebra, let A, B, C, D & E represent 5 logical expressions/predicates. Permutation of taking 3 at a time will result in $^5P_3 = 10$ possible permutations.
  A,B,C; A,B,D; A,B,E; A,C,D; A,C,E; A,D,E; B,C,D; B,C,E; B,D,E; C,D,E Representing all the permutations in an expression using Logical 'AND' and Logical 'OR' operators, $(C \& D \& E)|(B \& D \& E)|(B \& C \& E)|(B \& C \& D)|(A \& D \& E)|(A \& C \& E)|(A \& C \& D)|(A \& B \& C)|(A \& B \& D)|(A \& B \& E)$ Where '&' represents Logical 'AND', and '|' represents Logical 'OR' operator.

Using the Distributive property of Boolean algebra, the expression can be represented as:

$(C \& D \& E)|(B \& (D \& E|C \& E|C \& D))|(A \& (D \& E|C \& E|C \& D))|(A \& B \& (C|D|E))$

The expression can be further represented applying the distributive properties as $(C \& D \& E)|(B|A) \& (D \& E|C \& E|C \& D))|(A \& B \& (C|D|E))$ This expression is a desirable result which can be obtained using bit representation, wherein in the above example:
E is represented by 00000001
D is represented by 00000010
C is represented by 00000100
B is represented by 0000100
A is represented by 00010000

The following should be appreciated regarding the above example and regarding how the bitwise predicate patterns are formed, in an embodiment:

Each logical predicate is represented by a set of bits.
Such a set of bits is referred to herein as a "bitwise predicate pattern."
Each set may have the same number of bits.
Each bitwise predicate pattern has only one bit ON.
Each bitwise predicate pattern uniquely represents a single corresponding one of the logical predicates,
For each bitwise predicate pattern, the one bit that is ON indicates which one of the logical predicates the particular bitwise predicate pattern represents.

Each predicate in the query is replaced by its corresponding bitwise pattern. For example, as defined above, the logical expression "A,B,C; A,B,D; A,B,E; A,C,D; A,C,E; A,D,E; B,C,D; B,C,E; B,D,E; C,D,E" can be represented in bit wise pat-tern, as follows:
select * from table where (00010000|00001000|00000100)+
(00010000|00001000|00000010)+(00010000
100001000|00000001)+(00010000
100000100|00000010)+(00010000
100000100|00000001)+(00010000
100000010|00000001)+(00001000
100000100|00000010)+(00001000
100000100|00000001)+(00001000
100000010|00000001)+(00000100
100000010|00000001)

Here, the Logical 'AND' conjunct has been replaced by bit wise 'OR' operator.

Then the bit wise OR operator is applied to condense the conjuncts, as illustrated below:

00011100+00011010+00011001+00010110+
00010101+00010011+00001110+00001101+
00001011+00000111

The above logical bitwise expression is then factored using the Boolean distributive property, combining the last 3 bits together to form a logical bitwise expression, as illustrated below:

00011(100+010+001)+00010(110+101+011)+00001
(110+101+011)+00000(111)

The expression is further factored, as illustrated below:

00011(100+010+001)+(00010+00001)(011+101+
110)+00000(111)

Then, the compressed or factored logical bitwise expression is used to generate a logical predicate expression by mapping the predicates in the first query on to the bits yielding the following exemplary logical predicate expression, as illustrated below:
(A and B and (C or D or E)) OR (A or B) AND (C and D or C and E or D and E)) OR (C and D and E)
Then, the above defined logical predicate expression is used to generate a second query, which is now an optimized query, as illustrated below:
select * from table where
(A and B and (C or D or E)) OR (A or B) AND (C and D or C and E or D and E)) OR (C and D and E)

Then, the above optimized/second query is used to run against the database. This query yields a subset of data from the database that satisfies the minimum number of predicates.

An example embodiment of the invention extends current SQL to support a new clause 'ATLEAST' for such queries. The Syntax of ATLEAST clause may be as follows:
ATLEAST(N, predicate 1, predicate 2, predicate 3, ... predicate K)
Where K is the total number of predicates and N is the minimum number of predicates to be satisfied. Such a query as represented above make writing queries simpler and more readable as well, compared to a query with a number of OR clauses. The database optimizer may be modified, in an example mode, to support the 'ATLEAST' clause in the SQL syntax. The first query for the above set of predicates may be written as follows:
select * from employee where ATLEAST(3, Rating in (1,2+), Manager_Recom='Y', BU_profit>3, Salary< (select Avg(Salary) from employee), Current_dt-Join_Dt>2 years)
It is important to note here that the query having multiple "OR" clauses is same in the effect as that first query having an "ATLEAST" clause; however, an 'OR' clause is already supported in the database technology while an 'ATLEAST' clause is an embodiment of the current invention.

According to one embodiment of the invention, the database optimizer will re-write the first query and optimize the query to generate a second query as follows:
select * from employee where
(BU_profit>3 and Salary<(select Avg(Salary) from employee) and Current_dt-Join_Dt>2 years) OR
((Rating in (1,2+) or Manager_Recom='Y') AND
((Salary<(select Avg(Salary) from employee) and Current_dt-Join_Dt>2 years) Or (BU_profit>3 and Current_dt-Join_Dt>2 years)
Or (BU_profit>3 and Salary<(select Avg(Salary) from employee))))
OR (Rating in (1,2+) and Manager_Recom='Y' and (BU_profit>3 or Salary<(select Avg(Salary) from employee) or Current_dt-Join_Dt>2 years))

The following example gives more detailed explanation of the embodiments that represent multiple predicates in a bit format. A query is received in, and an example first query is as follows:
select * from table where ATLEAST(3,a=10,b=20,c=30, d=30,e=50)
In another example embodiment, if there are only 2 predicates A and B in a SQL query, out of which one needs to be true for the SQL to retrieve valid subset, the conventional SQL query will be:
select * from Tablet where A OR B.
This conventional SQL query, according to an example 'ATLEAST' representation, can be re-written as
select * from Tablet where ATLEAST(1, A,B)
Embodiments of the invention will yield better performance when the number of predicates is large.

Figure 2:
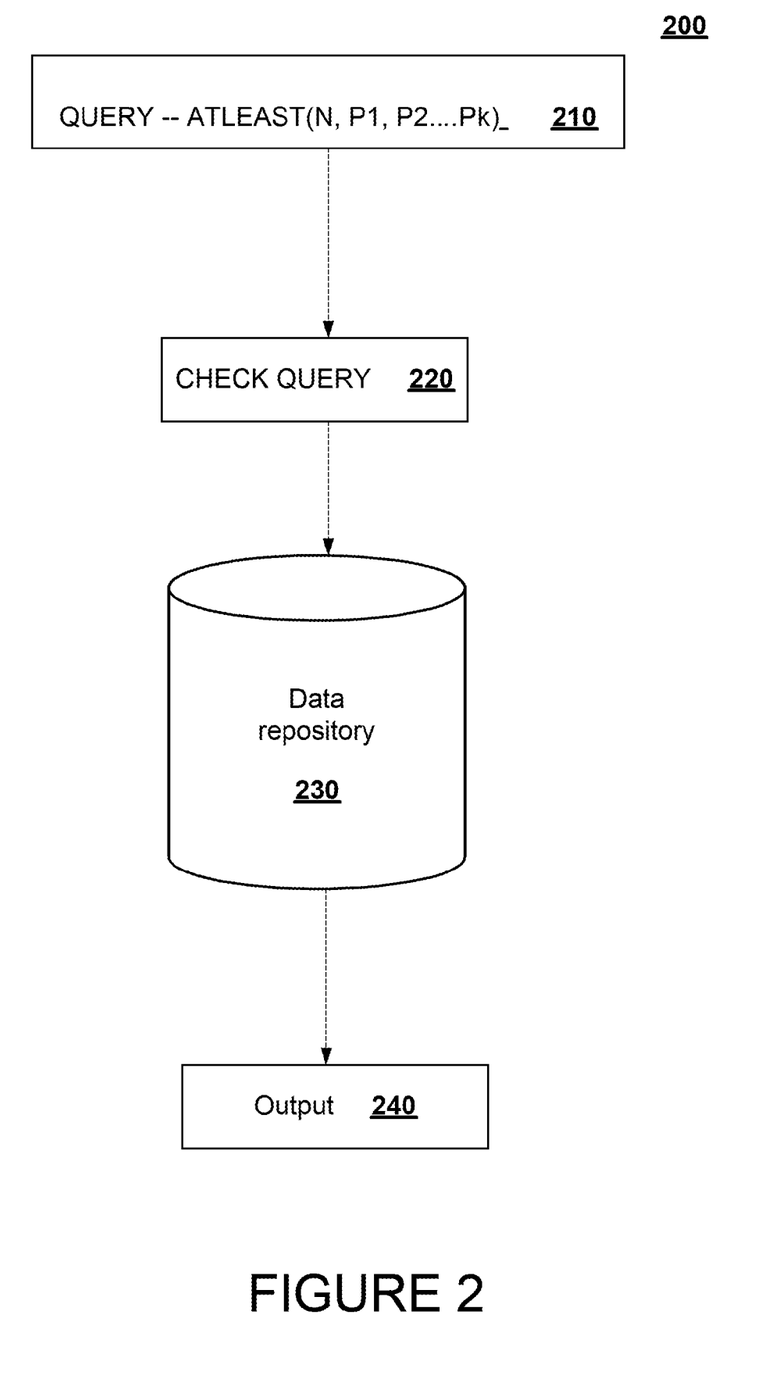
FIG. 2 depicts an example embodiment of a flow chart for retrieving a subset of data from a relational database.

FIG. 2 shows an example embodiment of a flow chart 200 for overall method of retrieving a subset of data from a relational database. It should be noted that flow chart 200 is similar to flow chart 100 of FIG. 1, except that FIG. 2 pertains to data repository being a relational database. In step 210, the query is explicitly shown as ATLEAST (N, P1, P2 ... PK), where K is the total number of predicates and N is the minimum number of predicates to be satisfied. In step 220, check if the query is in the new format that has been designed and if the format is OK, then the query is operated on a relevant repository 230 and the results are output in step 230.

Figure 3:
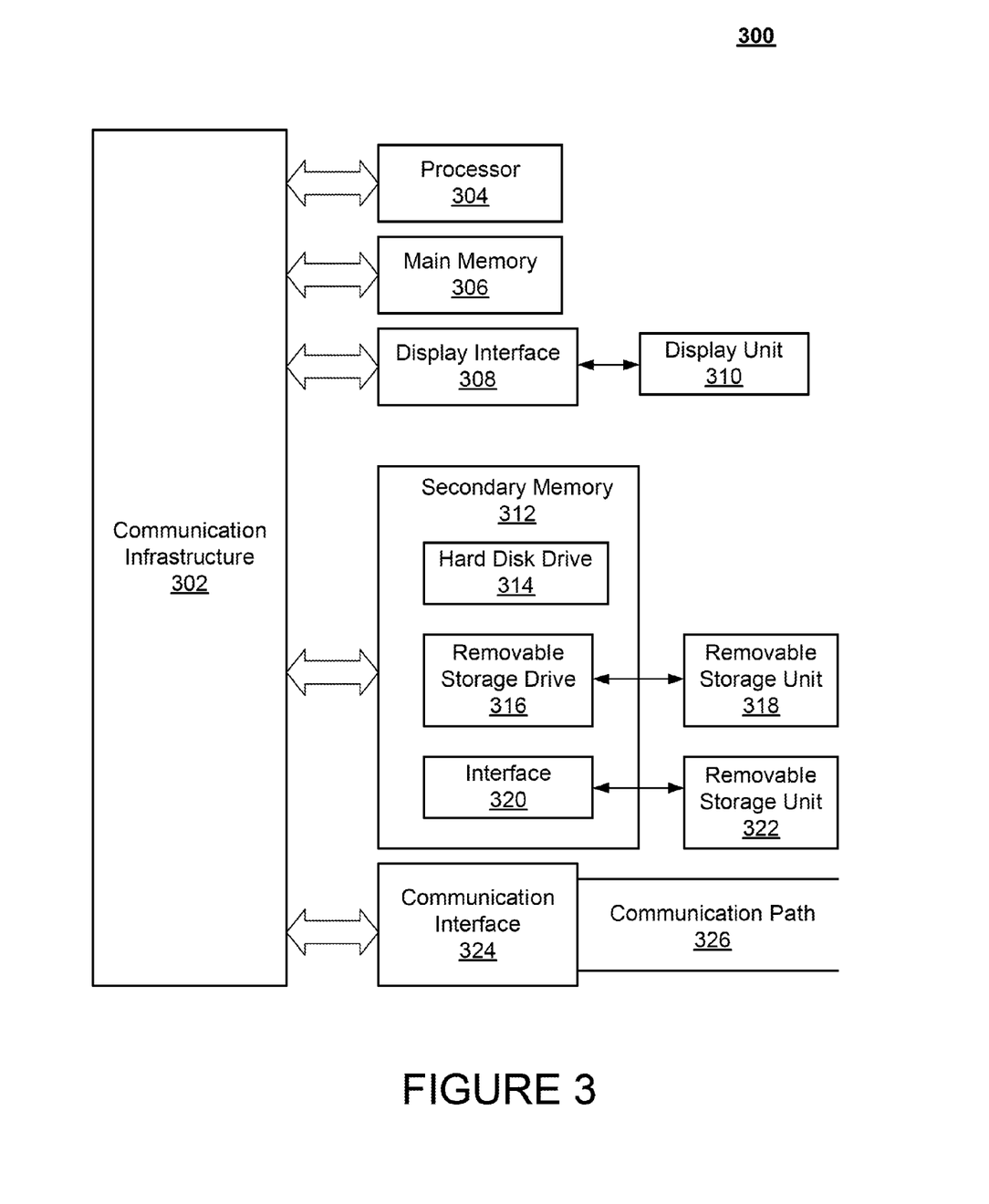
FIG. 3 shows an example embodiment of a schematic of a computer system used for retrieving a subset of data from a data repository.

FIG. 3 is a block diagram of an example computer system 300 that can be used for implementing various embodiments of the present invention. In some embodiments, the computer system 300 can be used to perform the steps described in either FIG. 1 or FIG. 2 or both. The Computer system 300 includes a processor 303. It should be understood although FIG. 3 illustrates a single processor, one skilled in the art would appreciate that more than one processor can be included as needed. The processor 303 is connected to a communication infrastructure 302 (for example, a communications bus, cross-over bar, or network) where the communication infrastructure 303 is configured to facilitate communication between various elements of the example computer system 300. Various software embodiments are described in terms of this example computer system. After reading this description, it will become apparent to a person of ordinary skill in the relevant art(s) how to implement the invention using other computer systems and/or computer architectures.

Example computer system 300 can include a display interface 308 configured to forward graphics, text, and other data from the communication infrastructure 302 (or from a frame buffer not shown) for display on a display unit 310. The computer system 300 also includes a main memory 306, which can be random access memory (RAM), and may also include a secondary memory 312. The secondary memory 312 may include, for example, a hard disk drive 314 and/or a removable storage drive 316, representing a floppy disk drive, a magnetic tape drive, an optical disk drive, etc. The removable storage drive 316 reads from and/or writes to a removable storage unit 318 in a manner well known to those having ordinary skill in the art. The removable storage unit 318, represents, for example, a floppy disk, magnetic tape, optical disk, etc. which is read by and written to by the removable storage drive 316. As will be appreciated, the removable storage unit 318 includes a computer usable storage medium having stored therein computer software and/or data.

In example embodiments, the secondary memory 312 may include other similar means for allowing computer programs or other instructions to be loaded into the computer system. Such means may include, for example, a removable storage unit 322 and an interface 320. Examples of such may include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to the computer system 300.

The computer system 300 may also include a communications interface 324. The communications interface 324 allows software and data to be transferred between the computer system and external devices. Examples of the communications interface 324 may include a modem, a network interface (such as an Ethernet card), a communications port, a PCMCIA slot and card, etc. Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. These propagated signals are provided to the communications interface 323 via a communications path (that is, channel) 326. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Advantages of various embodiments of the invention include simplification of developing queries to retrieve data repository. Other advantages of some of the other embodiments include developing less error-prone queries. Some other advantages of some embodiments of the invention include optimal usage of computing resources, such as, but not limited to the Central Processing Unit (CPU). Although the invention explains various advantages of some specific embodiments of the invention, those skilled in the art will appreciate from the teaching of the embodiments that the advantages of the invention are not limited to the above mentioned.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although example embodiments of the present invention have been described in detail, it should be understood that various changes, substitutions, and alternations could be made thereto without departing from spirit and scope of the inventions as defined by the appended claims. Variations described for example embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to example embodiments of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer implemented method for optimizing database transactions, comprising:
    receiving a query, the query specifying (i) a set of predicates supplied to the query and (ii) a minimal number of predicates in the set to be satisfied for a data record to be returned in a query result set;
    forming a bitwise predicate pattern for each of one of the specified predicates, including forming a unique set of bits for each one of the bitwise predicate patterns, each of the sets of bits having the same number of bits and having only one of the bits turned ON, such that each one of the bitwise predicate patterns uniquely represents a respective one of the predicates, and including forming the set of bits for each one of the bitwise predicate patterns such that the bit that is ON in a set of bits indicates which one of the predicates corresponds to which one of the bitwise predicate patterns;
    generating a logical expression using the sets of bits of the bitwise predicate patterns;
    performing operations on the logical expression to optimize the query, thereby producing an optimized query;
    using the optimized query on a repository stored in a computer readable storage medium to find a set of results satisfying the minimal number of predicates; and
    rendering the set of results satisfying the minimal number of predicates.

2. The computer implemented method as claimed in claim 1, wherein receiving the query includes receiving the query as a statement in the form "ATLEAST (N, p1, p2, p3, . . . pK)," wherein p1 to pK is the set of predicates supplied to the query, and wherein N is a number having a value in a range from 1 through K indicating the minimal number of predicates to be satisfied for a data record to be returned in a query result set.

3. The computer implemented method as claimed in claim 1, wherein the minimal number of predicates is a pre-defined threshold for the query to operate.

4. The computer implemented method as claimed in claim 1, wherein the repository comprises a structured data.

5. The computer implemented method as claimed in claim 1, wherein the query is in the form of Structured Query Language (SQL).

6. A computer program product comprising a non-transitory computer readable storage medium including computer usable code for optimizing database transactions, the computer usable code comprising:

computer usable code for receiving a query, the query specifying (i) a set of predicates supplied to the query and (ii) a minimal number of predicates in the set to be satisfied for a data record to be returned in a query result set;

computer usable code for forming a bitwise predicate pattern for each of one of the specified predicates, including forming a unique set of bits for each one of the bitwise predicate patterns, each of the sets of bits having the same number of bits and having only one of the bits turned ON, such that each one of the bitwise predicate patterns uniquely represents a respective one of the predicates, and including forming the set of bits for each one of the bitwise predicate patterns such that the bit that is ON in a set of bits indicates which one of the predicates corresponds to which one of the bitwise predicate patterns;

computer usable code for generating a logical expression using the sets of bits of the bitwise predicate patterns;

computer usable code for performing operations on the logical expression to optimize the query, thereby producing an optimized query;

computer usable code for using the optimized query on a repository stored in a computer readable storage medium to find a set of results satisfying the minimal number of predicates; and computer usable code for rendering the set of results satisfying the minimal number of predicates.

7. The computer program product as claimed in claim 6, wherein receiving the query includes receiving the query as a statement in the form "ATLEAST (N, p1, p2, p3, . . . pK)," wherein p1 to pK is the set of predicates supplied to the query, and wherein N is a number having a value in a range from 1 through K indicating the minimal number of predicates to be satisfied for a data record to be returned in a query results set.

8. The computer program product as claimed in claim 6, wherein the minimal number of predicates is a pre-defined threshold for the query to operate.

9. The computer program product as claimed in claim 6, wherein the repository comprises a structured data.

10. The computer program product as claimed in claim 6, wherein the query is in the form of Structured Query Language (SQL).

11. The computer program product of claim 6, wherein the computer usable code is stored in a computer readable storage medium in a data processing system, and wherein the computer usable code is transferred over a network from a remote data processing system.

12. The computer program product of claim 6, wherein the computer usable code is stored in a computer readable storage medium in a server data processing system, and wherein the computer usable code is downloaded over a network to a remote data processing system for use in a computer readable storage medium associated with the remote data processing system.

13. A data processing system for optimizing database transactions, the data processing system comprising:

a storage device including a storage medium, wherein the storage device stores computer usable program code; and a processor, wherein the processor executes the computer usable program code, and wherein the computer usable program code comprises:

computer usable code for receiving a query, the query specifying (i) a set of predicates supplied to the query and (ii) a minimal number of predicates in the set to be satisfied for a data record to be returned in a query result set;

computer usable code for forming a bitwise predicate pattern for each of one of the specified predicates, including forming a unique set of bits for each one of the bitwise predicate patterns, each of the sets of bits having the same number of bits and having only one of the bits turned ON, such that each one of the bitwise predicate patterns uniquely represents a respective one of the predicates, and including forming the set of bits for each one of the bitwise predicate patterns such that the bit that is ON in a set of bits indicates which one of the predicates corresponds to which one of the bitwise predicate patterns;

computer usable code for generating a logical expression using the sets of bits of the bitwise predicate patterns;

computer usable code for performing operations on the logical expression to optimize the query, thereby producing an optimized query;

computer usable code for using the optimized query on a repository stored in a computer readable storage medium to find a set of results satisfying the minimal number of predicates; and computer usable code for rendering the set of results satisfying the minimal number of predicates.

14. The data processing system as claimed in claim 13, wherein receiving the query includes receiving the query as a statement in the form "ATLEAST (N, p1, p2, p3, . . . pK)," wherein p1 to pK is the set of predicates supplied to the query, and wherein N is a number having a value in a range from 1 through K I indicating the minimal number of predicates to be satisfied for a data record to be returned in a query result set.

15. The data processing system as claimed in claim 13, wherein the minimal number of predicates is a pre-defined threshold for the query to operate.

16. The data processing system as claimed in claim 13, wherein the repository comprises a structured data.

17. The data processing system as claimed in claim 13, wherein the query is in the form of Structured Query Language (SQL).

* * * * *